United States Patent Office 2,900,230
Patented Aug. 18, 1959

2,900,230
METHOD OF DISINTEGRATING REFRACTORY BODIES

Robert P. Larsen, Park Forest, and Richard C. Vogel, Hinsdale, Ill., assignors to the United States of America as represented by the United States Atomic Energy Commission No Drawing. Application February 6, 1958
Serial No. 713,770

4 Claims. (Cl. 23—14.5)

The invention relates to a method of disintegrating refractory bodies. More particularly, the invention relates to a method of disintegrating and dissolving refractory bodies composed of particles of heavy metal oxides bonded together by a ceramic bond such as may be obtained by compacting and sintering the particles.

Examples of compacted sintered bodies are fuel elements for nuclear reactors. Fuel elements have been made by compacting powdered uranium dioxide and heating at an elevated temperature to produce a ceramic bond. A particularly valuable fuel element has been made which consists of uranium dioxide in a thorium dioxide matrix. This fuel element and details of a method of making it are described in Handwerk and Bach application Serial No. 640,056, filed February 13, 1957.

The thorium-uranium oxide fuel element has shown good radiation stability. However, it is particularly difficult to dissolve. A simple quick method of dissolving this fuel element and other uranium oxide and plutonium oxide containing fuel elements is important for chemical processing of the fuel.

An object of this invention is to provide a simple rapid method of dissolving the above-mentioned fuel elements.

Another object is to provide a simple and rapid method of dissolving other articles of manufacture composed of compacted sintered particles of refractory material such as crucibles and refractory fired bricks composed of oxides, carbides, nitrides and silicides of uranium, thorium and other heavy metals or refractory metals.

In accordance with one embodiment of this invention a refractory body composed of compacted sintered particles of a heavy metal oxide is immersed in a liquid alkali metal at an elevated temperature and for time sufficient to bring about substantial penetration of the liquid alkali metal into the material. The alkali metal is then removed and the metal contacted with a mineral acid adapted to dissolve the heavy metal oxide. The refractory body first disintegrates in the acid to form a slurry and then after a longer time interval, preferably with increase in temperature, the heavy metal oxide dissolves.

Suitable alkali metals are sodium, potassium and sodium-potassium alloys. Other liquid metals particularly those which are reducing agents for the refractory compound can be used but they all have disadvantages over the alkali metals. The most satisfactory of the other metals are the alkaline earth metals such as molten magnesium and calcium but the temperatures involved are high and the difficulties of processing are great.

The temperature of the metal can be any temperature at which the alkali metal is in a liquid or molten condition but preferably should be above the ambient temperature. A temperature of 500° C. with molten sodium gives very satisfactory results.

The time of contact of the fuel elements or other heavy metal oxide article with the alkali metal should be sufficient to obtain substantial penetration by the alkali metal. Satisfactory results have been obtained by exposing the metal to the alkali metal for about ten minutes. Longer periods of time such as one hour or longer have been used but there appears to be little difference in the speed of dissolution.

The addition of hot alkali metal to the refractory body rather than heating the alkali metal and refractory metal together has resulted in complete rupture of the refractory body. However, it is not necessary to bring about fracturing of the article since satisfactory results are obtained when the article remains in its original condition.

The alkali metal is removed from the fuel element or other refractory body by decanting. Any alkali metal such as sodium clinging to the refractory article may be removed by dissolving the alkali metal in alcohol.

After treatment with the alkali metal the refractory body is then contacted with mineral acid, such as nitric or sulphuric acid, which will dissolve the heavy metal oxide. The concentration of acid is not critical. A suitable acid and concentration is 12 m. nitric acid and it is preferred to have a catalyzing amount (such as .001 m.) of fluosilic acid present with the nitric acid.

The following example is given to illustrate the invention.

Example I

A finely powdered mixture of 90% by weight $ThO_2$ and 10% by weight $UO_2$ was compressed at 1300 p.s.i. in the form of cylindrical rods ⅜" long and ¼" in diameter and then fired at 1700° C. in air. The fuel element had a bulk density of 8.3 g./ml. It was exposed to molten sodium at 500° C. for ten minutes in a container under an argon atmosphere. At the end of the ten minute heating period the sodium was decanted and the container allowed to cool. The sodium clinging to the fuel element was dissolved in alcohol and the fuel element placed in cold water. The slow evaporation of gas indicated retention of sodium in the pores but with the exception of very minor fracturing the fuel element not only remained in its original shape but had apparently retained much of its original resistance to fracture. The fuel element was then placed in cold 12 m. nitric acid containing .0016 m. fluorsilic acid and a rapid disintegration to a finely divided powder resulted. The slurry was then heated to boiling and complete solution took place in fifteen minutes.

A comparative test was then run with the same fuel element without treating it with sodium. Complete solution was not affected with the same nitric acid at the same temperature until after five hours of contact.

Example II

A thorium crucible was treated with sodium followed by nitric acid in the same manner as described in Example I. Complete solution was affected in approximately ten minutes with nitric acid at 100° C.

Similar results from the point of view of rapidity of solution were obtained by treating articles composed of other heavy metal oxides such as $U_3O_8$, $PuO_2$ and $Cr_2O_3$ with sodium or potassium. Apparently, the alkali metal and similar reducing metals have the property of wetting the refractory oxide and penetrating into the pores of the refractory oxide bodies forming micro-cracks. Because of the formation of these micro-cracks, the acid which otherwise would take a long period of time to dissolve the heavy metal oxide bodies first brings about a disintegration of the body into a fine powder followed by rapid dissolution.

It will be understood that this invention is not to be limited to the details given herein but that it may be modified within the scope of the appended claims.

What is claimed is:

1. The method of disintegrating a fuel element composed of compacted sintered particles including uranium dioxide which comprises contacting the fuel element with liquid alkali metal for a time and at a temperature sufficient to form cracks in the fuel element; removing the liquid metal, and contacting the fuel element with a mineral acid solvent for the uranium dioxide.

2. A method of dissolving a fuel element composed of compacted sintered particles of uranium dioxide which comprises immersing the fuel element in a liquid metal of the group consisting of alkali metals and alkaline earth metals for a time and temperature sufficient to bring about substantial penetration by the liquid metal, removing the liquid metal; and contacting the fuel element with a mineral acid solvent for the uranium dioxide for a time and at a temperature sufficient to dissolve the uranium dioxide.

3. A method of dissolving a fuel element composed of compacted sintered particles of thorium oxide and uranium oxide which comprises immersing the fuel element in a liquid metal of the group consisting of alkali metals and alkaline earth metals for a time and at a temperature sufficient to bring about substantial penetration by the liquid metal, removing the liquid metal, and contacting the fuel element with a mineral acid solvent for the thorium oxide and uranium oxide.

4. A method of dissolving a fuel element composed of compacted sintered particles of thorium oxide and uranium oxide which comprises immersing the fuel element in liquid sodium for a time and at a temperature sufficient to bring about substantial penetration by the sodium, removing the sodium, and contacting the fuel element in nitric acid for a time and at a temperature sufficient to dissolve the fuel element.

References Cited in the file of this patent

UNITED STATES PATENTS

| 214,055 | Robertson | Apr. 8, 1879 |
| 2,330,750 | Schaller et al. | Sept. 28, 1943 |
| 2,764,470 | Richardson et al. | Sept. 25, 1956 |

OTHER REFERENCES

Stephenson: Introduction to Nuclear Engineering, 1954, McGraw-Hill Book Co., Inc., pages 95–97.

Proceedings of the International Conference on the Peaceful Uses of Atomic Energy, vol. 9, Aug. 8–20, 1955, United Nations 1956, Voigt, pages 591–595.